Nov. 7, 1967  R. W. JOHNSON  3,351,245
DISPENSER FOR GROUND COFFEE AND THE LIKE
Filed Aug. 15, 1966
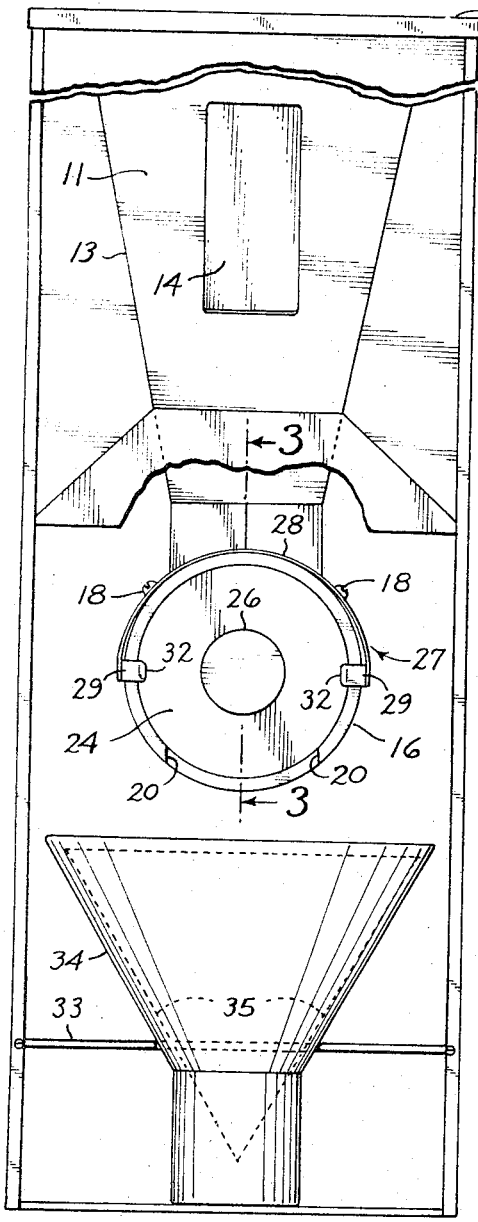
Fig. 1.
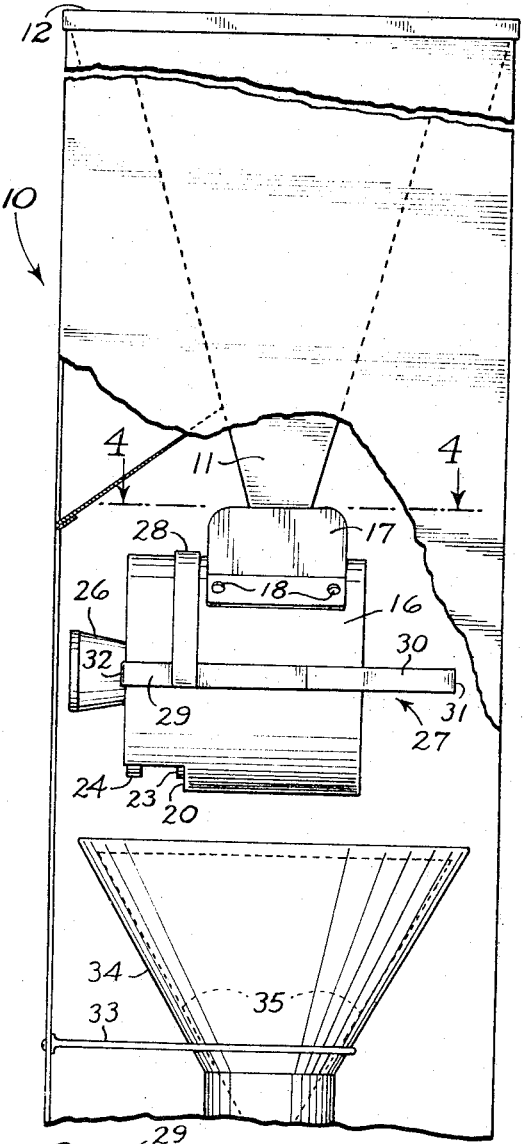
Fig. 2.
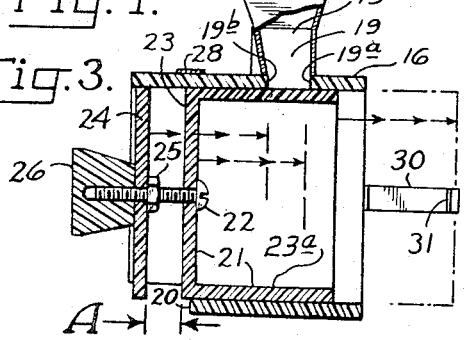
Fig. 3.
Fig. 4.
Rudolph W. Johnson
INVENTOR
Kolisch + Hartwell
Attys.

3,351,245
DISPENSER FOR GROUND COFFEE AND THE LIKE

Rudolph W. Johnson, Troutdale, Oreg., assignor to Boyd Coffee Company, Portland, Oreg., a corporation of Oregon
Filed Aug. 15, 1966, Ser. No. 572,271
3 Claims. (Cl. 222—308)

ABSTRACT OF THE DISCLOSURE

A dispenser including a hopper with a hollow open-ended cylinder mounted adjacent the base of the hopper. The hopper communicates with the cylinder interior through a hole in the top side of the cylinder. A plunger assembly including a piston and a cutoff plate mounted on and spaced axially from one end of the piston is reciprocatable within the cylinder, and functions to receive a measured amount of coffee when positioned under the opening of the top side of the cylinder and to dump such coffee when pulled toward an end of the cylinder through an opening in the bottom of the cylinder.

---

This invention relates to a manually operated device for dispensing a measured quantity of dry product such as ground coffee to be used in brewing coffee.

In many restaurants and other establishments it has been found desirable to brew coffee frequently in relatively small batch lots rather than in larger amounts which become stale on standing too long. According to one popular method of brewing coffee, a measured amount of ground coffee is placed in a filter cone and thereafter hot water poured over the coffee grounds. Semi-automatic equipment for infusing the correct amount of water at the right temperature is known. When an infusion method is employed it is desirable from a point of view of speed, efficiency and the production of a uniformly good product to be able consistently and rapidly to measure out a desired quantity of coffee grounds into a filter cone or other receptacle.

According to the present invention a simple, reliable relatively inexpensive device is provided that will rapidly dispense a desired quantity of ground coffee into a receptacle that is used in brewing coffee.

While the invention will be described with respect to a dispenser for a particular type of coffee brewing apparatus it is to be understood that it is equally applicable to other types of coffee brewing apparatus or other types of material where it is desired to dispense a fixed quantity of a product and the invention is limited only as set forth in the following description and appended claims.

The invention will now be described in greater detail, referring to the following description which is to be taken in conjunction with the accompanying drawings wherein:

FIG. 1 is a front elevation of the dispenser according to the invention;

FIG. 2 is a side elevation of FIG. 1;

FIG. 3 is a section on the line 3—3 of FIG. 1, and

FIG. 4 is a section on the line 4—4 of FIG. 2.

10 generally indicates a stand of suitable lightweight material such as sheet metal, the upper portion of which comprises a hopper 11, which has removable top 12 and downwardly tapering sides 13 containing viewing window 14 for observing the contents of the hopper. An opening 15 is provided in the bottom of the hopper.

A hollow cylinder having openings at opposite ends and formed of a tubular wall 16 is fastened to the bottom of hopper 11 by bracket 17 and screws 18. An opening or aperture 19 is provided in cylinder 16 which corresponds with the opening in the bottom of the hopper. The openings at the base of the hopper and in the cylinder are elongated, preferably generally rectangularly shaped, and extend transversely of the axis of the cylinder. The sides of such opening and hole nearer the rear end of the cylinder (or toward the right end in FIG. 4), are straight, as shown at 19a. The sides of the opening and hole nearer the forward end of the cylinder extend in reaches which are inclined relative to a plane perpendicular to the axis of the cylinder, as illustrated at 19b in FIG. 4. Adjacent the forward end of the cylinder is a cutout portion 20 in the bottom side of the cylinder.

A smooth walled piston 21 including an end wall 23 and skirt 23a is slidably positioned within cylinder 16. A bolt 22 projects through the center of end wall 23 of the piston. A cutoff plate 24 having the same diameter as wall 23 is centrally mounted on bolt 22. The axial position of plate 24 with respect to wall 23 may be adjusted by nut 25. Space or chamber A between wall 23 and plate 24 serves as the ground coffee measuring chamber and determines the amount of coffee that will be dispensed. Knob 26 on bolt 22 may be used as a handle for manipulating the piston. The piston, cutoff plate and bolt constitute a plunger assembly in the construction, and the bolt constitutes means extending axially between the piston and the cutoff plate mounting one on the other.

A harness of sheet metal generally indicated at 27 fits around cylinder 16 and is resiliently clamped thereto by band 28 partially encircling the cylinder, and arms 29. Extensions 30 from arms 29 have stops 31 projecting at right angles therefrom and radially inwardly of the tubular wall 16, which act to engage the rear edge of piston 21 when it is pushed into an "in" or loading position as shown in dotted lines—FIG. 3. The front ends of arms 29 are turned in to form stops 32 projecting radially inwardly of tubular wall 16, which act to limit movement of piston 21 when pulled outwardly into an "out" or dumping position. These turned-in front ends, together with smaller inturned rear ends of the arms 29 shown in FIG. 4 prevent axial shifting of the harness on the cylinder.

There is provided in the bottom of stand 10 a bracket 33 beneath cutout 20 which is adapted to receive a cone 34 with a filter 35 positioned therein.

The operation of the device is as follows: The hopper is filled with coffee and a cone with a filter in it is positioned in bracket 33. Plate 24 is axially positioned with respect to wall 23 so that space A will hold the desired amount of coffee. Piston 20 is pushed to "in" position so that space A is aligned with opening 15 which heretofore has been closed by the wall of the piston. As soon as space A is in position beneath opening 15 it is filled with coffee. The piston is then pulled out and when space A passes over cutout 20 the ground coffee is dumped into filter 35 in cone 34.

Side 19b of the opening in the cylinder acts as a cutoff point between the ground coffee in space A and the rest of the coffee in the hopper. It has been found that providing the incline described in side 19b permits the piston to move freely within the cylinder. As the piston is pulled to the "out" position ground coffee will not remain lodged between the cylinder and piston and a smooth clean cutoff of coffee from the hopper is achieved, particularly when the piston is slightly rotated as it is withdrawn to "out" position.

It will be noted that in the preferred embodiment of the invention, sides 13 of hopper 11 are evenly tapered from the top of the hopper to opening 15 in the bottom. Experimentation with variously shaped hoppers has revealed that in hoppers having straight sides the amount of coffee dispensed will vary, depending on whether the hopper is full or nearly empty condition. It has been found that as the amount of coffee in the hopper diminishes, the weight of the coffee in the measuring chamber also diminishes. It is believed that this is brought about by the diminution in pressure at the opening in the bottom as the amount of coffee in the hopper is reduced. I have found that with a hopper having a capacity of about seven pounds ground coffee, if the sides of the hopper are evenly tapered towards each other from the top to the opening in the bottom precisely the desired amount of coffee will be dispensed into the chamber on each operation of the piston as long as there is coffee in the hopper.

It is claimed and desired to secure by Letters Patent:

1. A dispenser for ground coffee and the like comprising, in operative position, an upright hopper having an opening at the bottom end thereof; a hollow cylinder formed of a tubular wall and having openings at opposite ends mounted adjacent the base of the hopper; said cylinder also having an aperture in its top side communicating with the opening in the bottom end of the hopper, and a cutout area adjacent one end and in the bottom side thereof; a plunger assembly mounted for reciprocal movement within said cylinder; said plunger assembly comprising a piston with an end wall and cylindrical skirt, a circular cut-off plate axially aligned with said piston and spaced from said end wall thus to define a chamber between the cutoff plate and end wall, and means extending axially between the piston and cutoff plate mounting one on the other; and detachable harness means detachably secured to the cylinder and including stops adjacent each end of the cylinder projecting radially inwardly of the tubular wall of the cylinder limiting reciprocal movement of said plunger assembly between a pair of limit positions; said plunger assembly being removable through one of the open ends of the cylinder on removal of said harness means; said chamber registering with said aperture whereby it may receive coffee from the hopper with the plunger assembly in one limit position and registering with the cut-off area in the cylinder whereby coffee may dump from the chamber with the plunger assembly in its other limit position.

2. The dispenser of claim 1, wherein the said detachable harness means comprises a band partially encircling the cylindrical element and resiliently clamped thereto, and arm structure joined to said band and adapted to fit on the cylindrical element and hold it from axial shifting on the element.

3. The apparatus of claim 1, wherein said opening at the bottom end of the hopper and said aperture in said cylinder are elongated and extend transversely of the axis of the cylinder, and the sides of the opening and aperture nearer the end of the cylinder which is provided with the cutoff area extend in reaches that are inclined to a plane perpendicular to the axis of the cylinder.

References Cited

UNITED STATES PATENTS

| 512,837 | 1/1894 | McEliney | 222—308 |
| 1,015,680 | 1/1912 | Hollingsworth | 222—440 |
| 3,122,279 | 2/1964 | Crum | 222—308 |

FOREIGN PATENTS

| 678,872 | 9/1952 | Great Britain. |

ROBERT B. REEVES, *Primary Examiner.*

N. L. STACK, *Assistant Examiner.*